(12) United States Patent
Gordon et al.

(10) Patent No.: US 8,960,091 B2
(45) Date of Patent: *Feb. 24, 2015

(54) INITIATOR WITH MOLDED ESD DISSIPATER

(75) Inventors: Scott C. Gordon, Hyde Park, UT (US); Jeffrey T. Kida, Layton, UT (US); Benoit Sable, Daoulas (FR)

(73) Assignee: Autoliv ASP, Inc., Ogden, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/110,591

(22) PCT Filed: Mar. 30, 2012

(86) PCT No.: PCT/US2012/031664
§ 371 (c)(1),
(2), (4) Date: Oct. 8, 2013

(87) PCT Pub. No.: WO2012/138580
PCT Pub. Date: Oct. 11, 2012

(65) Prior Publication Data
US 2014/0026774 A1    Jan. 30, 2014

Related U.S. Application Data

(63) Continuation of application No. 13/082,451, filed on Apr. 8, 2011, now Pat. No. 8,397,639.

(51) Int. Cl.
*F42B 3/10* (2006.01)
*B29C 45/14* (2006.01)
(Continued)

(52) U.S. Cl.
CPC ............. *F42B 3/10* (2013.01); *B29C 45/14639* (2013.01); *B29C 45/1671* (2013.01); *B29K 2995/0005* (2013.01); *B29K 2995/0007* (2013.01); *B60R 2021/26029* (2013.01)

USPC ................ 102/202.9; 102/202.2; 102/202.12

(58) Field of Classification Search
USPC ............ 102/202.1–202.12; 280/741; 264/255
See application file for complete search history.

(56) References Cited

U.S. PATENT DOCUMENTS 3,264,989 A    8/1966    Rucker
4,530,516 A    7/1985    Adams et al.
(Continued)

FOREIGN PATENT DOCUMENTS

EP    0802092 A1    10/1997
RU    2060179 C1    5/1996

OTHER PUBLICATIONS

International Search Report and Written Opinion of the ISA regarding Application No. PCT/US2012/031664, ISA/RU, mailed Apr. 8, 2014.
(Continued)

*Primary Examiner* — Michael David
(74) *Attorney, Agent, or Firm* — Harness, Dickey & Pierce, P.L.C.

(57) ABSTRACT

An initiator assembly can include an outer body can have a first end, a second end, and an internal passage between the first and second ends. An initiator canister can be joined to the outer body at the first end and can define a charge chamber that includes a pair of pins extending therefrom. An insulative material can be molded within the passage to form an insulative structural member that joins the canister and pins to the outer body and insulates the pins and a portion of the canister from electrical contact with the outer body. An electrostatic discharge dissipater can be formed from an electrically conductive material and can be molded to the outer body. The dissipater can provide a controlled dissipation path for electrostatic discharge energy carried by the initiator assembly.

15 Claims, 5 Drawing Sheets

(51) Int. Cl.
  *B29C 45/16* (2006.01)
  *B60R 21/26* (2011.01)

(56) References Cited

U.S. PATENT DOCUMENTS

| | | | |
|---|---|---|---|
| 4,690,063 A | 9/1987 | Granier et al. | |
| 4,745,858 A | 5/1988 | Harder | |
| 5,131,679 A | 7/1992 | Novak et al. | |
| 5,233,925 A | 8/1993 | Fohl | |
| 5,337,674 A | 8/1994 | Harris et al. | |
| 5,462,448 A | 10/1995 | Kida et al. | |
| 5,648,634 A | 7/1997 | Avory et al. | |
| 5,763,814 A | 6/1998 | Avory et al. | |
| 5,932,832 A | 8/1999 | Hansen et al. | |
| 6,234,534 B1 | 5/2001 | Warren | |
| 6,979,021 B2 | 12/2005 | Young et al. | |
| 7,210,703 B2 | 5/2007 | Young et al. | |
| 7,338,623 B2 | 3/2008 | Torii | |
| 8,234,034 B2 | 7/2012 | Brisighella, Jr. et al. | |
| 8,573,645 B2 * | 11/2013 | Lefevre et al. | 280/741 |
| 2002/0174792 A1 | 11/2002 | Kubozuka et al. | |
| 2005/0039624 A1 | 2/2005 | Furusawa et al. | |
| 2010/0332074 A1 | 12/2010 | Brisighella, Jr. et al. | |
| 2012/0239225 A1 | 9/2012 | Brisighella, Jr. et al. | |
| 2012/0256406 A1 * | 10/2012 | Gordon et al. | 280/741 |
| 2013/0068123 A1 * | 3/2013 | Lefevre et al. | 102/530 |
| 2014/0026774 A1 * | 1/2014 | Gordon et al. | 102/202.9 |

OTHER PUBLICATIONS

International Preliminary Report on Patentability regarding Application No. PCT/US2012/031664, IB Geneva, mailed Jun. 24, 2014.

* cited by examiner

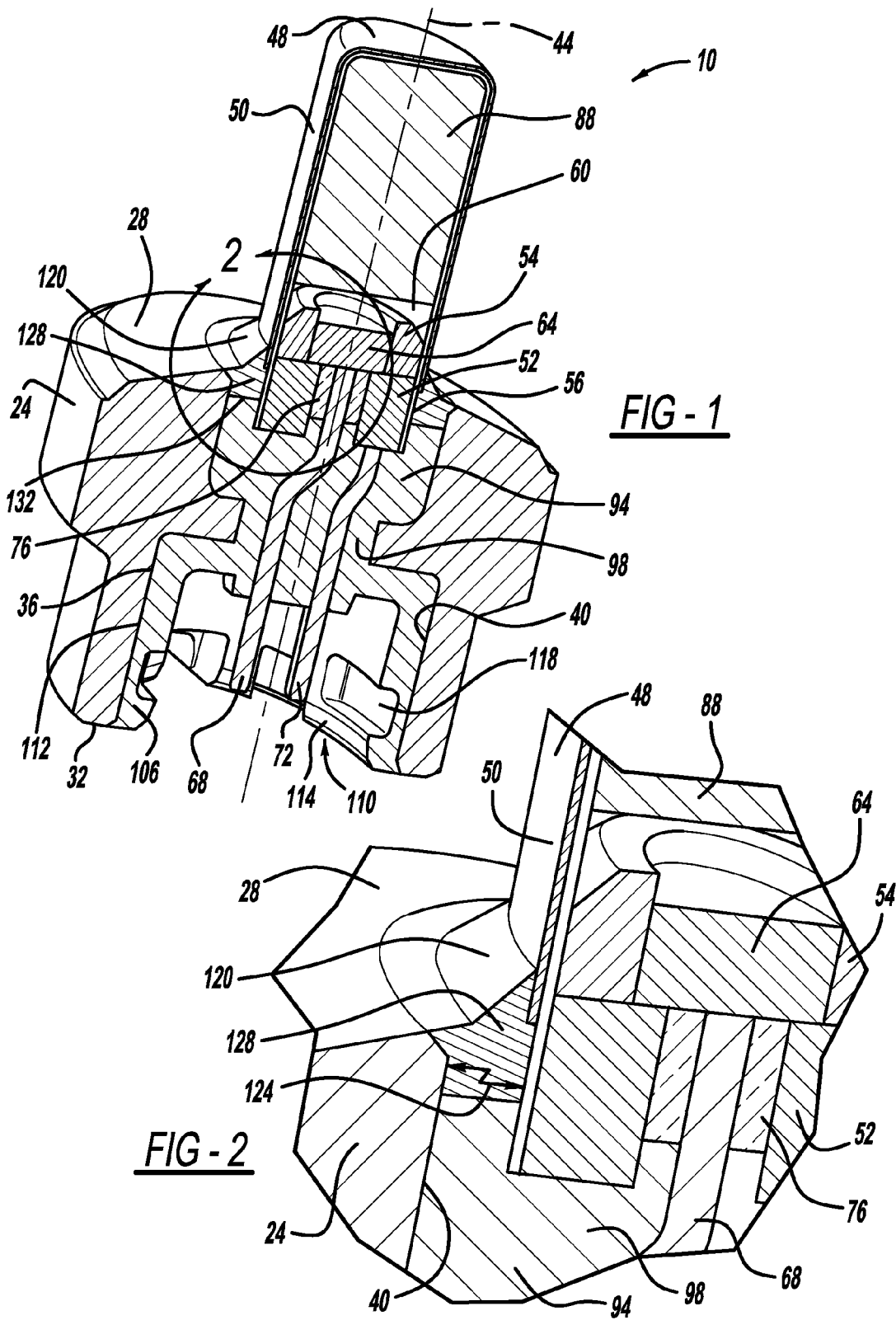

INITIATOR WITH MOLDED ESD DISSIPATER

CROSS-REFERENCE TO RELATED APPLICATIONS

This application is a 371 U.S. National Stage of International Application No. PCT/US2012/031664, filed 30 Mar. 2012, which claims priority to U.S. Patent Application No. 13/082,451, filed 08 Apr. 2011 (now U.S. Pat. No. 8,397,639 issued 19 Mar. 2013). The disclosures of the above applications are entirely incorporated by reference herein.

FIELD

The present disclosure relates generally to an initiator, and more particularly to an initiator with a molded electrostatic discharge dissipater.

BACKGROUND

This section provides background information related to the present disclosure that is not necessarily prior art.

Inflators for inflating an air bag or other inflatable restraint in a vehicle typically include an initiator device for igniting a gas generant material that is contained in the inflator. The initiator device can include a pyrotechnic device configured to ignite the gas generant material upon actuation. Such an initiator device can be inherently sensitive to electrostatic discharge (ESD) energy, which is a product of triboelectric charging that can occur naturally in a vehicle interior, as is known in the art. As a result, various design approaches have been implemented to mitigate such ESD energy in an effort to ensure that such energy does not affect the functionality of the initiator device.

Two common design approaches include the use of a defined spark gap or a varistor. One drawback of the defined spark gap approach is that the initiator must be designed to include a specifically toleranced air gap, which is often difficult due to initiator design and packaging constraints. In addition, the defined spark gap approach typically results in an abrupt discharge of stored ESD energy once the ESD energy reaches the breakdown voltage potential of air. Regarding the use of varistors, they are discrete purchased components that require additional processing during manufacturing of the initiator device, as well as are often not feasible due to cost constraints.

Thus, while initiator devices with defined spark gaps or varistors work for their intended purpose, there remains a need for continuous improvement in the relevant art.

SUMMARY

This section provides a general summary of the disclosure, and is not a comprehensive disclosure of its full scope or all of its features.

In one form, an initiator assembly is provided in accordance with the teachings of the present disclosure. The initiator assembly can include an outer body, an initiator canister, an insulative structural member and an electrostatic discharge dissipater. The outer body can have a first end, an opposite second end, and can form an internal passage between the first and second ends. The initiator canister can be joined to the outer body at the first end. The initiator canister can define a charge chamber having a reactive charge disposed therein and can include a pair of electrically conductive pins extending therefrom. An insulative material can be molded within the internal passage to form the insulative structural member that joins the initiator canister and pins to the outer body. The insulative material can insulate the pins and a portion of the initiator canister from electrical contact with the outer body. The electrostatic discharge dissipater can be formed from an electrically conductive material and can be molded to the initiator canister and the outer body at the first end. The electrostatic discharge dissipater can electrically connect the initiator canister to the outer body to provide a controlled dissipation path for electrostatic discharge energy carried by the initiator assembly.

In another form, an initiator assembly is provided in accordance with the teachings of the present disclosure. The initiator assembly can include a conductive outer body, an initiator canister, an insulative structural member and an electrostatic discharge dissipater. The conductive outer body can have a first end, an opposite second end, and can form an internal passage between the first and second ends. The initiator canister can have an open end joined to the outer body at the first end. The initiator canister can define a charge chamber having a reactive charge disposed therein and can include a pair of electrically conductive pins extending therefrom. An insulative material can be molded within the internal passage to form the insulative structural member joining the initiator canister and pins to the outer body. The insulative material can surround the initiator canister and can insulate the pins and a portion of the initiator canister from electrical contact with the outer body. The electrostatic discharge dissipater can be formed from an electrically conductive material and can be molded to the open end of the initiator canister and the outer body at the first end. The electrostatic discharge dissipater can encapsulate a portion of the initiator canister and can electrically connect the initiator canister to the outer body to provide a controlled dissipation path for electrostatic discharge energy carried by the initiator assembly.

In yet another form, a method of forming an initiator assembly is provided in accordance with the teachings of the present disclosure. The method can include injecting a first material into a mold with a first shot of a two shot injection molding process to form an insulative structural member integrally molded to an outer body and joining an initiator canister and initiator pins extending therefrom to the outer body. A portion of the initiator pins and an open end of the initiator canister can be encapsulated with the first material to electrically insulate the pins and a portion of the initiator canister from the outer body. The method can further include injecting a second material different from the first material with a second shot of the two shot molding process into the mold to form an electrostatic discharge dissipater integrally molded to the initiator canister and the outer body. The electrostatic discharge dissipater can form a controlled dissipation path from the initiator canister to the outer body for dissipation of electrostatic discharge energy carried by the initiator assembly.

In still another form, an initiator assembly is provided in accordance with the teachings of the present disclosure. The initiator assembly can include an outer body, an initiator canister, an insulative structural member and an electrostatic discharge dissipater. The outer body can have a first end, an opposite second end, and can form an internal passage between the first and second ends. The initiator canister can be joined to the outer body at the first end, and can define a charge chamber for receiving a reactive charge and can include a pair of electrically conductive pins extending therefrom. An insulative material can be molded within the internal passage to form the insulative structural member that can join the initiator canister and pins to the outer body, where the insulative structural member can insulate the initiator canister from direct electrical contact with the outer body. The electrostatic discharge dissipater can be formed from an electrically conductive material and can be molded to at least the outer body proximate the second end. The electrostatic discharge dissipater can form at least a portion of a pocket proximate the second end of the outer body that is adapted to receive a connector, and can electrically connect the pins to the outer body to provide a controlled dissipation path for electrostatic discharge energy carried by at least the initiator assembly.

In yet another form, an initiator assembly is provided in accordance with the teachings of the present disclosure. The initiator assembly can include an electrical connector having an interface portion, a conductive outer body, an initiator canister, an insulative structural member and an electrostatic discharge dissipater. The conductive outer body can have a first end, an opposite second end, and can form an internal passage between the first and second ends. The initiator canister can be joined to the outer body at the first end, can define a charge chamber for receiving a reactive charge, and can include a pair of electrically conductive pins extending therefrom. The insulative material can be molded within the internal passage to form an insulative structural member joining the initiator canister and pins to the outer body. The insulative structural member can insulate at least the initiator canister from direct electrical contact with the outer body. The electrostatic discharge dissipater can form from an electrically conductive material and can be molded to at least the outer body proximate the second end. The electrostatic discharge dissipater can form at least a portion of a pocket proximate the second end of the outer body that can be configured to receive the interface portion of the connector. The electrostatic discharge dissipater can electrically connect the pins to the outer body to provide a controlled dissipation path for electrostatic discharge energy carried by the initiator assembly, and the electrostatic discharge dissipater can provide a grounding connection between the interface portion of the connector and the outer body.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, the appended claims and the following drawings. The drawings are for illustrative purposes only of selected embodiments and not all possible limitations, and are not intended to limit the scope of the present disclosure.

FIG. 1 is a perspective view of an exemplary integral initiator assembly in accordance with the teachings of the present disclosure;

FIG. 2 is an enlarged view of a portion of the integral initiator assembly of FIG. 1 in accordance with the teachings of the present disclosure;

DETAILED DESCRIPTION

Figure 3:
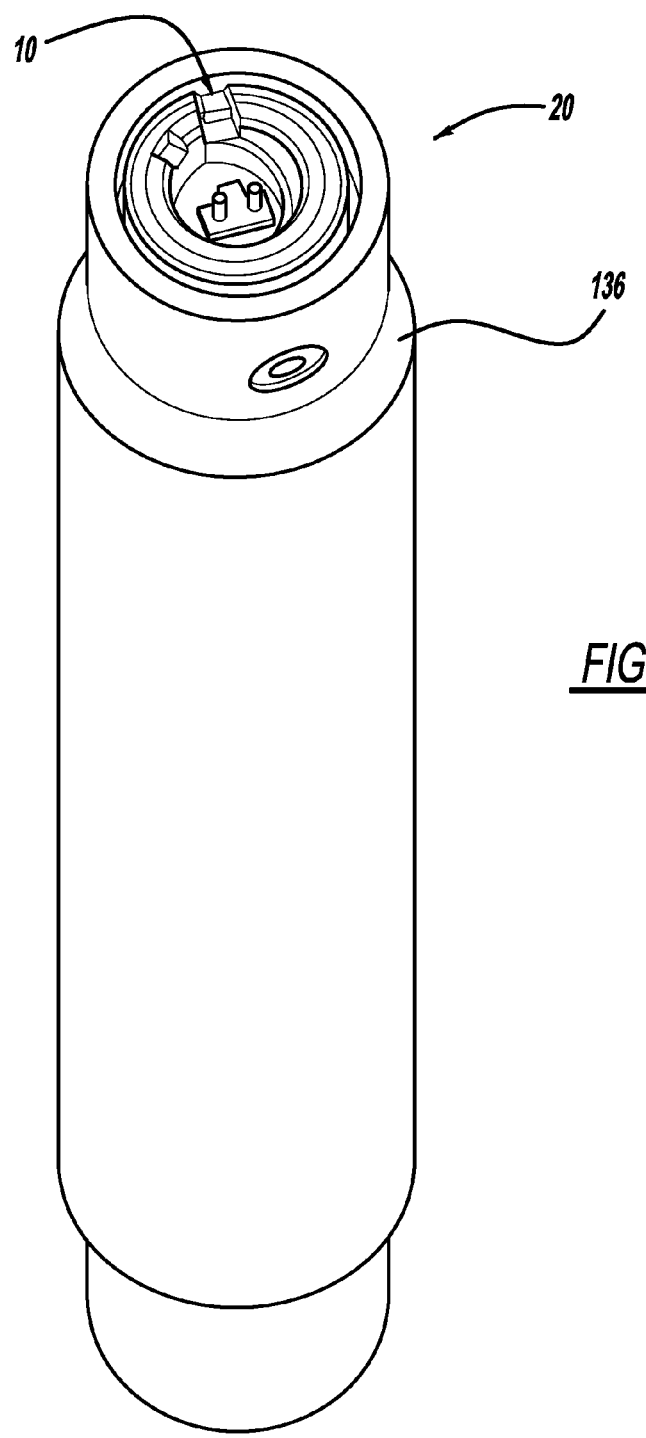
FIG. 3 is a perspective view of an exemplary inflator assembly incorporating the integral initiator assembly of FIG. 1 in accordance with the teachings of the present disclosure.

The following description is merely exemplary in nature and is not intended to limit the present disclosure, its application, or uses. It should be understood that throughout the several views of the drawings, corresponding reference numerals indicate like or corresponding parts and features with the various elements in each view being drawn to scale.

Throughout the description, exemplary embodiments are provided so that this disclosure will be thorough, and will fully convey the scope to those who are skilled in the art. Numerous specific details are set forth such as examples of specific components, devices, systems and/or methods, to provide a thorough understanding of exemplary embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-3, an exemplary integral initiator assembly 10 is provided in accordance with the teachings of the present disclosure. The integral initiator assembly 10 can include an integrally molded electrostatic discharge (ESD) dissipater that can be customizable in its geometry for use in a specific application, such as an air bag inflator assembly 20 (FIG. 3). Although the following description is related generally to integral initiator assemblies for use with the exemplary inflator assembly 20, it will be appreciated that the integral initiator assembly 10 discussed herein can be applicable to other assemblies and/or systems including, but not limited to, a seat belt pretensioner. Further, it will be understood that the inflator assembly 20 discussed herein can be used with various inflatable restraint installations including driver, passenger and side impact restraint installations for various automotive vehicles.

As will be discussed in greater detail below, the integral initiator assembly 10 can provide a cost savings over conventional initiator devices while also being formed with an integrally molded ESD dissipater. The integral initiator assembly 10 with the molded ESD dissipater can be formed using a two shot injection molding process, thereby reducing processing time and complexity associated with manufacturing the integral initiator assembly 10, as will also be discussed below.

The integral initiator assembly 10 can include an outer collar body 24 having a first end portion 28 and a second end portion 32 opposite the first end portion 28. The collar body 24 can form an internal passage 36 defined by an inner wall 40 extending from the first end portion 28 to the second end portion 32. As will be appreciated by those skilled in the art, the collar body 24 can have any suitable size and shape depending upon the desired configuration of the inflator or higher assembly 20 in which the initiator assembly 10 will be used. The collar body 24 can be rigid and can be formed of any suitable material that is conductive, such as for example, metal. As shown in FIG. 1, the collar body 24 can include a generally cylindrical shape and can be generally positioned about a longitudinal axis 44 of the initiator assembly 10. The passage 36 can have any suitable size and/or shape that can facilitate the unification of initiator assembly components with the collar body 24, as will be discussed in greater detail below.

With particular reference to FIG. 1, an initiator canister 48 can be joined to an eyelet 52 and a charge holder 54 at an open end portion 56. The initiator canister 48 can extend outwardly from the first end portion 28 along longitudinal axis 44. The initiator canister 48 can form or define a charge chamber 60 therein and can include an outside surface 50 with at least a portion of the outside surface 50 separated or spaced apart from inner wall 40 of collar body 24. The charge chamber 60 can include at least one actuatable reactive charge material 64 surrounded by the charge holder 54 that, upon actuation, can produce reaction products such as gas and/or heat. The initiator canister 48 can be made of materials known in the art, such as metal, and formed such that it can be ruptured by the discharged reaction products of the actuated reactive charge 64. In an exemplary configuration, the initiator canister 48 can be ruptured by the reactive charge 64 directly, for example, by an exothermic reaction of the reactive charge 64 within the charge chamber 60.

Typically, known inflator initiators include at least one electrical terminal, often a conductive pin, for electrical contact with an associated electrical connector and are designed to receive an electrical signal therefrom. In the exemplary integral initiator assembly 10 of FIG. 1, the initiator canister 48 can include a pair of electrical terminals, shown as first and second electrical conductive pins 68 and 72, respectively, in actuating communication with the reactive charge 64. The electrical conductive pins 68 and 72 are in actuating communication with the reactive charge 64 when the conductive pins 68 and 72 are able to initiate reaction of the reactive charge 64 upon receiving an electrical signal from an associated electrical connector (e.g., connector 250 of FIG. 6). In one exemplary configuration, the charge holder 54 can include an annular groove configured to receive a portion of the reactive charge 64 therein. The reactive charge 64 can include one or more known reactive charge materials that can be actuated by an electrical current introduced through conductive pins 68 and 72. Examples of reactive charges known in the art include mixtures having zirconium and potassium perchlorate (ZPP), for example.

As shown in FIG. 1, the first conductive pin 68 can be coupled to the initiator canister 48 with one end positioned within the eyelet 52 and an opposite end toward the second end portion 32 of collar body 24. An insulating material 76 within the eyelet 52 can be used to separate and insulate the first conductive pin 68 from the eyelet 52. The second conductive pin 72, separate from the first conductive pin 68, can be attached directly to the eyelet 52. As is known in the art, a bridgewire (not shown) can be used to connect the first conductive pin 68 to the eyelet 52 when the insulating material 76 is present, thereby closing a circuit between the first conductive pin 68 and the second conductive pin 72. As will be appreciated, various electrical terminal configurations known in the art can be used with the integral initiator assembly 10 of the present disclosure.

In an exemplary configuration of the integral initiator assembly 10, a gas generant material 88 can be contained within the charge chamber 60 in addition to the reactive charge 64. The gas generant material 88 can be actuated by the reaction of the reactive charge 64, and not directly by the electrical current from the conductive pins 68 and 72, to produce a gas. Gas generant materials for use with integral initiator assembly 10 can be provided in various forms including wafer, pellet and grain forms, for example. Exemplary gas generant materials for use with initiator assembly 10 can include or contain a combustible fuel and oxidizer combination. In one configuration, the fuel can include an organic compound that is rich in nitrogen and oxygen content as such fuel materials can desirably reduce the amount of oxidizer required for combustion thereof.

In the configuration shown in FIG. 1, an insulative material 94 can join the initiator canister 48 to the collar body 24 to form the integrally molded initiator assembly 10. In one exemplary configuration, the insulative material 94 can be applied to components of the initiator assembly 10 by a first shot of a two shot injection molding process used to form the integrally molded initiator assembly 10, as will be discussed below in greater detail. The insulative material 94 can be disposed between the inner wall 40 of collar body 24 and at least a portion of the initiator canister 48 and/or eyelet 52 to firmly secure the initiator canister 48 and eyelet 52 to collar body 24 to form an insulative structural member 98, as shown for example in FIG. 1. In addition, the insulative material 94 can be an electrically insulative material to electrically insulate and/or isolate the initiator canister 48, including eyelet 52 and pins 68, 72, from unintended electrical contact with collar body 24.

The insulative material 94 can be disposed within the passage 36 using any suitable method or process, including the two shot injection molding process briefly discussed above. When using the injection molding process, the insulative material 94 can be injected as a liquid or flowable material into the passage 36 and about the inner wall 40 of collar body 24 and at least a portion of the initiator canister 48 and eyelet 52 to form the insulative structural member 98. When the injection molded insulative material 94 solidifies, the initiator canister 48, eyelet 52 and associated pins 68, 72 can be fixedly held or secured to the collar body 24 via insulative structural member 98, as shown in FIG. 1.

Those skilled in the art and guided by the teachings herein will appreciate that the insulative material 94 can be formed from a variety of materials including various thermoplastic or similar compositions know in the art that are conducive to processing via injection molding and are well suited for providing electrical insulation. In general, properties or conditions that can be important in the selection of an appropriate material for use in such an application include: tensile and impact strength, electrical insulating properties or characteristics, as well as having a melt temperature lower than the autoignition temperature of the associated reactive charge material. Glass-reinforced nylon is an exemplary material that can be used as the insulative material 94 to form the insulative structural member 98. Examples of other suitable materials that can be used in such an application include glass-reinforced polyester, glass-reinforced polyetherimide and other thermoplastic materials known in the art.

As shown in FIG. 1, the integral initiator assembly 10 can include a mating interface portion 106 at the second end portion 32. In one exemplary configuration, the mating interface portion 106 can be formed as a portion of the insulative structural member 98 during the first shot of the two shot injection molding process. The mating interface portion 106 can include at least a portion of the conductive pins 68, 72 and can include a customizable attachment configuration 110 sized and shaped to provide for connection of the integrally molded initiator assembly 10 to an associated electrical connector. In this regard, the mating interface portion 106 can be customized to match various configurations of electrical connectors. For example, the mating interface portion 106 can cover an inside area 112 of passage 36 at the second end portion 32 and define interface attachment features, such as a retaining shoulder 114 and/or recessed pocket 118 sized and shaped to hold the electrical connector securely in and to the mating interface portion 106.

In the exemplary configuration shown in FIGS. 1 and 2, the integrally molded initiator assembly 10 can include a molded dissipater member 120 configured to provide a controlled dissipation path for ESD energy. The molded dissipater member 120 can be formed using any suitable process, including the two shot injection molding process discussed above. In this regard, molded dissipater member 120 can be formed using a second shot of the two shot injection molding process and can be customizable in size and shape for use in a variety of initiator devices or other higher end assemblies.

Molded dissipater member 120 can be positioned relative to the first end portion of collar body 24 and radially between the initiator canister 48 and the collar body 24, as shown in FIGS. 1 and 2. In the exemplary configuration illustrated, molded dissipater member 120 can encapsulate the open end portion 56 of initiator canister 48 and extend radially outward to conductive collar body 24. In one form, molded dissipater member 120 can be molded into an annular recessed area 132 between initiator canister 48 and collar body 24. As initiator canister 48 can be in direct contact with eyelet 52, molded dissipater member 120 can provide a direct dissipation path 124 from initiator canister 48, as well as the associated eyelet 52 and at least one of the conductive pins 68, 72.

An electrically conductive material 128 can be used for the molded dissipater member 120 to provide the direct, controlled dissipation path 124 for the ESD energy or charge that can build up and/or be carried by integral initiator assembly 10. The molded dissipater member 120 formed with the electrically conductive material 128 can direct ESD energy away from the pyrotechnic materials in initiator canister 48 and to the conductive collar body 24 and intended ground. In this regard, at least a portion of the molded dissipater member 120 can be positioned axially between the reactive charge 64 and the collar body 24, as shown for example in FIG. 1. In addition, the molded dissipater member 120 can also direct ESD energy from a charged higher assembly, such as an inflator body, to the ground pin 72 of the of the integrally molded initiator assembly 10 in a controlled manner. For example, the ESD energy can be directed from the higher potential inflator body to ground pin 72 via the electrically conductive material 128 in contact with the eyelet 52.

In one exemplary configuration, the electrically conductive material 128 can include a plastic resin material with a lower surface resistivity in the range of between approximately $10^3$ to $10^9$ ohms as compared to the generally insulative properties of typical engineered plastics that have a surface resistivity in the range of $10^{14}$ to $10^{18}$ ohms. As one of ordinary skill in the art will appreciate, low surface resistivity can be a desired material property where static electricity dissipation is required. Decreased surface resistivity, and thus increased conductivity, can be imparted to plastic materials by using additives such as carbon, carbon fiber, or stainless steel fiber. The amount of conductive additive material imparted to the plastic material or resin can be selectively controlled to create a desired conductivity of the molded dissipater member 120 to form the controlled dissipation path 124 for the ESD energy. In this regard, the electrically conductive material 128 can include a conductivity high enough to slowly dissipate the ESD energy to ground while being insulative enough to otherwise prevent an unintended current leakage path.

With additional reference to FIG. 3, the integrally molded initiator assembly 10 can be assembled into a higher assembly, such as the illustrated air bag inflator assembly 20 for an air bag assembly (not shown). In the inflator assembly 20, the conductive metal collar body 24 can be in direct contact with a housing 136 of the inflator assembly 20, which can be connected to electrical ground. For example, inflator assembly 20 can be attached to a vehicle in connection with the air bag assembly, which would provide a dissipative path for the ESD energy from the integral initiator assembly 10 to the inflator assembly 20 and then to an intended ground, such as vehicle ground in this example.

As briefly discussed above and with additional reference to FIG. 4, the two shot injection molding process can be used to form the integral initiator assembly 10. The two shot injection molding process can utilize a two cavity mold and an injection molding machine having first and second independent injection units, each of which can shoot a different material into a respective cavity of the mold, as is known in the art. The two shot injection molding process provides for being able to use two different resin materials (e.g., the insulative material 94 and the electrically conductive material 128) in first and second shots within the same mold tooling. This can provide for producing the integral initiator assembly 10 at a lower cost and in a more dimensionally consistent manner, as will be discussed in greater detail below.

For example, in the first shot of the two shot molding process, the insulative material 94 can be injected via the first injection unit into the first cavity of the mold at block 150 and flow relative to the collar body 24 and initiator canister 48 with the eyelet 52 and pins 68, 72 extending therefrom. The first shot of the injected insulative material 94 can form the insulative structural member 98 with mating interface portion 106 about the collar body 24, pins 68, 72, eyelet 52 and initiator canister 48, as discussed above and shown in FIG. 1. While the insulative material 94 is being injected into the first cavity, the mold volume to be occupied by the second shot (i.e., the electrically conductive material 128) can be shut off from the first injection unit.

Once the insulative material 94 has been injected in the first shot, the mold can be opened and rotated, such as 180 degrees, and then aligned with the second injection unit at block 154. The mold can then be closed and the second shot of electrically conductive material 128 can be injected into the second cavity to form the molded dissipater member 120 at block 158. After sufficient cooling, the mold can be opened and the integrally molded initiator assembly 10 can be ejected therefrom at block 162.

In one exemplary configuration, the two shot injection molding process can be accomplished with an indexing system, such as a round table, with first and second stations having the respective first and second injection units. In this configuration, the first shot can be injected into the first cavity at the first station. The mold can then be opened and rotated 180 degrees as discussed above while the table is indexing to align the mold with the second station. The second shot can then be injected into the second cavity, as discussed above.

Thus, by using the two shot injection molding process, both the insulative material 94 and the electrically conductive material 128 can be used with the same tooling in the same cycle to form the integrally molded initiator assembly 10. The process provides for eliminating a need for separate tooling for the different resin materials, which can create additional tolerance stack-ups and thus less dimensional consistency. The two shot injection molding process can also reduce the cost of manufacturing such an initiator assembly by eliminating a need for an operator to work the mold tooling and handle the parts between the first and second shots. The integral initiator assembly 10 can also include enhanced strength properties due to the integrally molded nature of each of its components. Further, the molded dissipater member 120 provides for a continuous controlled dissipation path for ESD energy from a high potential source to ground as compared to the more abrupt discharge experienced in a conventional initiator with a spark gap design when the ESD energy reaches the breakdown voltage potential of air and discharges all at once through the air gap.

Figure 5:
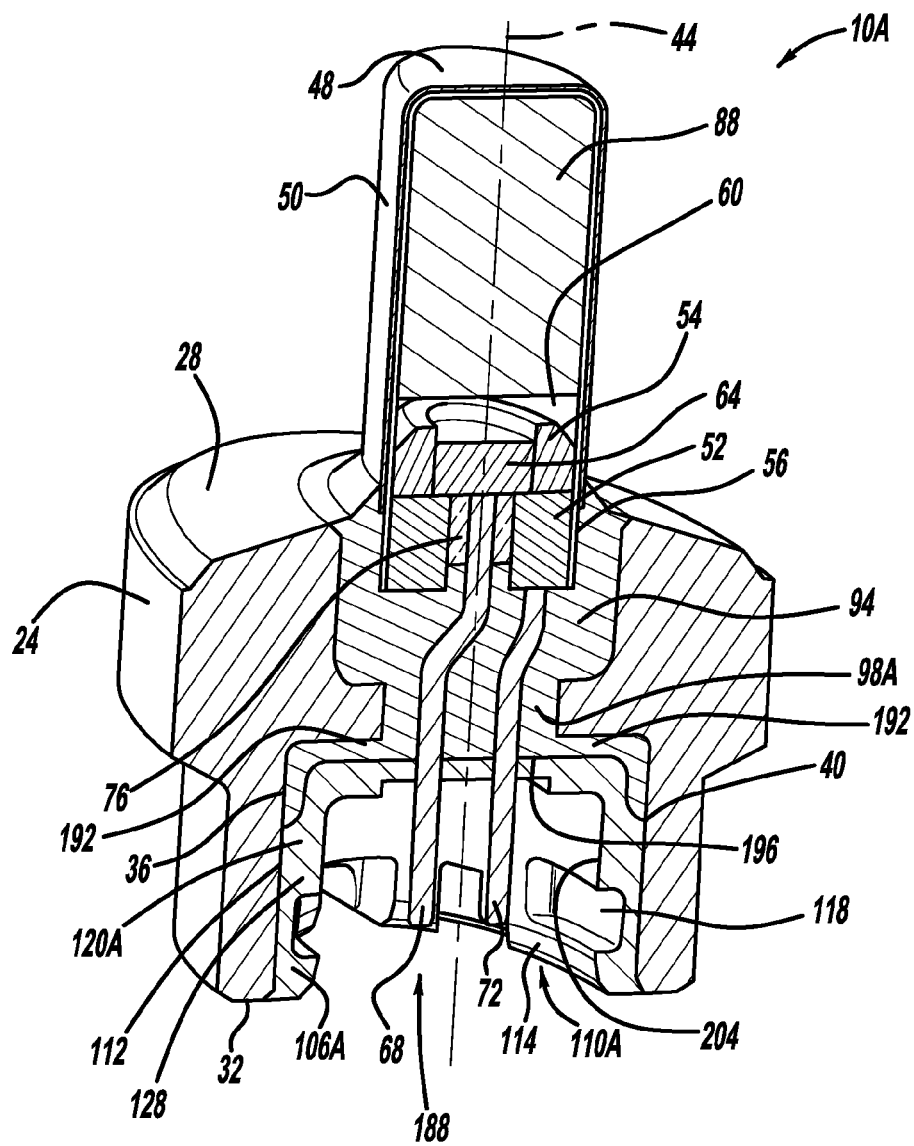
FIG. 5 is a perspective view of an exemplary integral initiator assembly in accordance with the teachings of the present disclosure.

Turning now to FIG. 5, another exemplary integral initiator assembly 10A is shown in accordance with the present teachings. Integral initiator assembly 10A can be similar to integral initiator assembly 10 such that like reference numerals refer to like or corresponding features and only differences will be discussed in detail. Integral initiator assembly 10A can also include an ESD dissipater member that can also be customizable in its geometry for use in a specific application, such as the air bag inflator assembly shown in FIG. 3. Similar to initiator assembly 10, the integral initiator assembly 10A can be formed using the two shot molding process, thereby reducing processing time and complexity associated with manufacturing the initiator assembly 10A, as will be discussed below in greater detail.

In the exemplary configuration shown in FIG. 5, a first end 180 of the insulative material 94 can extend proximate the first end portion 28 of collar body 24 so as to take the place of the molded dissipater member 120 (FIG. 1). A second end 184 of the insulative material 94 can extend into a pocket area 188 partially covering the inner wall 40 formed by collar body 24. In one exemplary configuration, the second end 184 can extend only partially into the pocket area 188 about inner wall 40 so as to stop or terminate before second end portion 32 of collar body 24 and form insulative structural member 98A. In this exemplary configuration, the molded ESD dissipater member 120A can be positioned in pocket area 188 in contact with inner wall 40 and electrical pins 68, 72 to establish a three-way grounding connection with a corresponding electrical connector (e.g., connector 250 shown in FIG. 6) and conductive collar body 24, as will be discussed in greater detail below.

Figure 6:
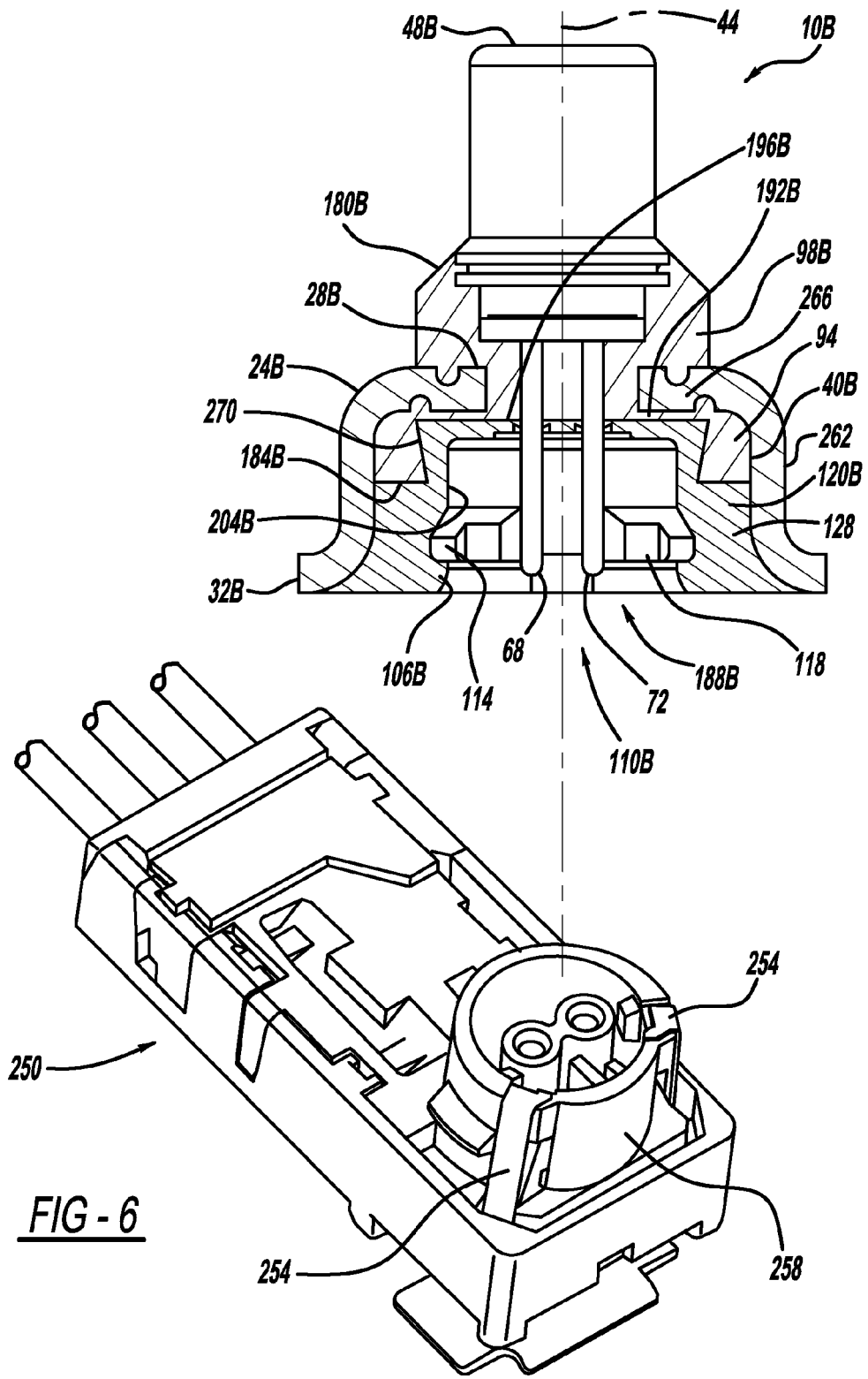
FIG. 6 is a perspective view of an exemplary integral initiator assembly in accordance with the teachings of the present disclosure.

In the exemplary configuration shown in FIG. 5, molded ESD dissipater member 120A can be formed from electrically conductive material 128 and can include an annular shape molded in contact with the annular inner wall 40. In one exemplary configuration, molded ESD dissipater member 120A can extend axially along inner wall 40 from the second end portion 32 of collar body 24 and into contact with a lateral portion 192 of insulative structural member 98A so as to laterally span across pocket area 188 at an upper end 196 thereof and contact each of pins 68 and 72. In this exemplary configuration, the ESD dissipater member 120A can form mating interface portion 106A having a customizable attachment configuration 110A with interface attachment features similar to those of mating interface portion 106 of FIG. 1. However, unlike initiator assembly 10, the mating interface portion 106A is formed by the molded ESD dissipater 120A so as to form a direct electrical grounding connection between conductive collar body 24 and an associated connector, such as connector 250 (FIG. 6).

The molded ESD dissipater member 120A of integral initiator assembly 10A can, similar to ESD dissipater member 120, provide a controlled dissipation path for the ESD energy or charge that can build up and/or be carried by integral initiator assembly 10A via direct contact with pins 68, 72 and conductive collar body 24. The molded ESD dissipater member 120A formed with the electrically conductive material 128 can direct ESD energy away from the pyrotechnic materials in initiator canister 48 to the collar body 24 and intended ground. In this regard, the molded dissipater member 120B can provide a continuous controlled dissipation path for ESD energy from a high potential source to ground as compared to the more abrupt discharge experienced in a conventional initiator with a spark gap design when the ESD energy reaches the breakdown voltage potential or air and discharges all at once through the air gap.

The molded ESD dissipater member 120A can also facilitate a three-way connection with an exemplary connector, such as connector 250, to provide an integral grounding feature for the overall assembly. In other words, in addition to the two-way connection provided in connection with pins 68, 72, an electrical contact or contacts 254 on an interface portion 258 of connector 250 (FIG. 6) can contact an inner wall portion 204 of molded ESD dissipater member 120A thereby providing a third, direct electrical or grounding connection from connector 250 to conductive collar body 24 and the intended ground. This integral grounding connection can, for example, eliminate a need for an external wire or other external electrical connection element(s) to establish a grounding connection between the connector 250 and the collar body 24.

Figure 4:
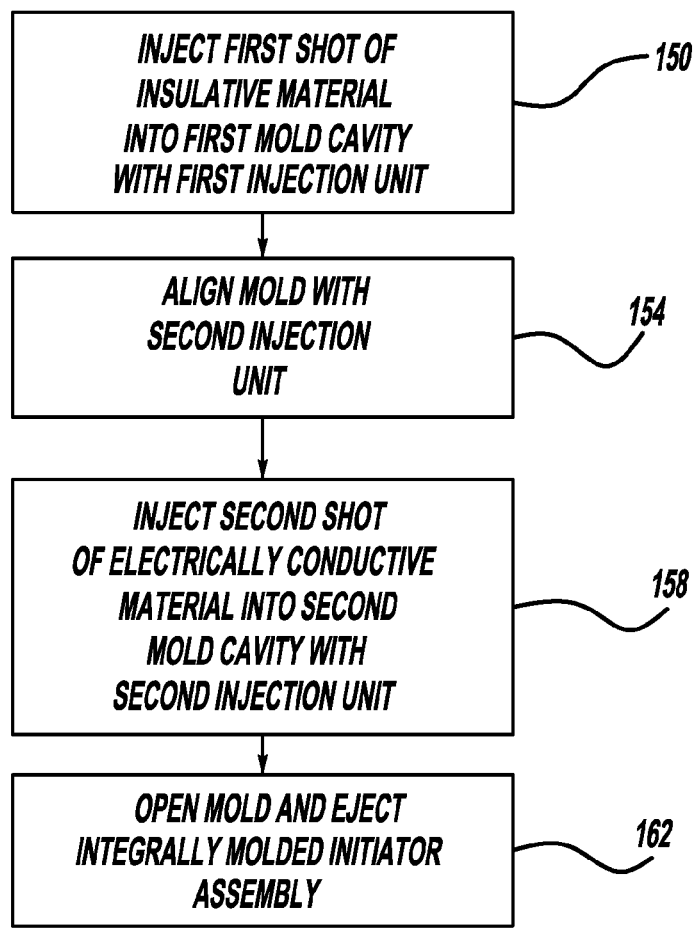
FIG. 4 is a flowchart depicting an exemplary process for forming the integral initiator assembly of FIG. 1 in accordance with the teachings of the present disclosure.

The integrally molded initiator assembly 10A can be formed using the two-shot process discussed in connection with FIG. 4 in a similar manner to that of integral initiator assembly 10. For example, in the first shot of the two shot molding process, the insulative material 94 can be injected via the first injection unit into the first cavity of the mold and flow relative to the collar body 24 and initiator canister 48 with the eyelet 52 and pins 68, 72 extending therefrom. The first shot of the insulative material can form the insulative structural member 98A shown in FIG. 5.

Once the insulative material 94 has been injected in the first shot to form the insulative structural member 98A, the mold can be opened and rotated, such as 180 degrees, and then aligned with the second injection unit. The mold can then be closed and the second shot of electrically conductive material 128 can be injected into the second cavity to form the molded dissipater member 120A in pocket area 188. After sufficient cooling, the mold can be opened and the integrally molded initiator assembly 10A can be ejected therefrom in a similar manner as discussed above for integral initiator assembly 10.

Turning now to FIG. 6, another exemplary integral initiator assembly 10B is shown in accordance with the present teachings. Integral initiator assembly 10B can be similar to integral initiator assembly 10A such that like reference numerals refer to like or corresponding features and only differences will be discussed in detail. Integral initiator assembly 10B can include an ESD dissipater member that can also be customizable in its geometry for use in a specific application, such as the air bag inflator assembly shown in FIG. 3. Similar to initiator assembly 10A, the integral initiator assembly 10B can be formed using the two shot molding process, thereby reducing processing time and complexity associated with manufacturing initiator assembly 10B, as will be discussed below in greater detail.

In the exemplary configuration shown in FIG. 6, integral initiator assembly 10B can include an insulative structural member 98B formed from the insulative material 94 in a manner similar to that of integral initiator assembly 10A. The insulative structural member 98B can be formed relative to conductive collar body 24B such that a first end 180B of insulative structural member 98B extends above a first end portion 28B of collar body 24B and a second end 184B extends around and beyond the first end portion 28B partially toward a second end portion 32B of collar body 24B, as shown in FIG. 6. In the exemplary configuration illustrated, collar body 24B can include an annular shape having an outwardly angled second end portion 32B, a substantially axially extending portion 262 and an inwardly extending portion 266 terminating at first end portion 28B. As will be appreciated by those skilled in the art, the collar body 24B can have any suitable size and shape depending upon the desired configuration of the inflator or higher assembly 20 in which the initiator assembly 10B will be used. Insulative structural member 98B can be formed around initiator canister 48B and first end portion 28B of collar body 24B so as to integrally couple initiator canister 48B to collar body 24B in a similar manner to that discussed above in connection with integral initiator assemblies 10 and 10A.

In one exemplary configuration, the second end 184B of collar body 24B can extend only partially into pocket area 188B about inner wall 40B so as to stop or terminate before the second end portion 32B, as shown in FIG. 6. In this exemplary configuration, the molded ESD dissipater member 120B can be positioned in pocket area 188B in contact with inner wall 40B and electrical pins 68, 72 to establish the three-way grounding connection with a corresponding electrical connector, such as connector 250, as will be discussed in greater detail below.

In the exemplary configuration shown in FIG. 6, molded ESD dissipater member 120B can be formed from electrically conductive material 128 and can include an annular shape in contact with the annular inner wall 40B. The molded ESD dissipater member 120B can extend axially along inner wall 40B from the second end portion 32B of collar body 24B into contact with a lateral portion 192B of insulative structural member 98B so as to laterally span across pocket area 188B at an upper end 196B thereof and contact each of pins 68 and 72. In this exemplary configuration, the ESD dissipater member 120B can form mating interface portion 106B having a customizable attachment configuration 110B with interface attachment features similar to those of mating interface portions 106 and 106A of FIGS. 1 and 4, respectively. In the exemplary configuration illustrated in FIG. 6, insulative structural member 98B can include an annular undercut 270 extending radially outward toward axially extending portion 262 of collar body 24B. The molded ESD dissipater member 120B can be formed into the undercut 270 to aid in retention of molded dissipater member 120 relative to collar body 24B and insulative structural member 98B.

The molded ESD dissipater member 120B of integral initiator assembly 10B can similarly provide a controlled dissipation path for the ESD energy or charge that can build up and/or be carried by integral initiator assembly 10B via direct contact with pins 68, 72 and conductive collar body 24B. The molded dissipater member 120B formed with the electrically conductive material 128 can direct ESD energy away from the pyrotechnic materials in initiator canister 48B to conductive collar body 24B and intended ground. In this regard, the molded dissipater member 120B can provide a continuous controlled dissipation path for ESD energy from a high potential source to ground in a substantially similar manner as ESD dissipater member 120A.

Similar to integral initiator assembly 10A, the molded ESD dissipater member 120B can also facilitate a three-way connection with exemplary connector 250 to provide an integral grounding feature for the overall assembly. The electrical contacts 254 on interface portion 258 of connector 250 can contact an inner wall portion 204B of molded ESD dissipater member 120B thereby providing the third electrical connection from connector 250 to collar body 24B and the intended ground. This integral grounding connection can, similar to initiator assembly 10A, eliminate the need for an external wire or other external electrical connection element to establish a grounding connection between the connector 250 and the collar body 24B. The integral initiator assembly 10B can also be formed using the two-shot process in a manner substantially similar to that discussed above for integral initiator assembly 10A.

While one or more specific examples have been described and illustrated, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof.

What is claimed is:

1. A method for forming an initiator assembly comprising:
   injecting a first material into a mold with a first shot of a two shot injection molding process to form an insulative structural member integrally molded to an outer body and joining an initiator canister and initiator pins extending therefrom to the outer body;
   encapsulating a portion of the initiator pins and an open end of the initiator canister with the first material to electrically insulate the pins and a portion of the initiator canister from the outer body; and
   injecting a second material different from the first material with a second shot of the two shot molding process into the mold to form an electrostatic discharge dissipater integrally molded at least to the outer body proximate an end of the outer body;
   wherein the electrostatic discharge dissipater forms at least a portion of a pocket proximate the end of the outer body that is adapted to receive a connector, the electrostatic discharge dissipater electrically connecting the pins to the outer body to provide a controlled dissipation path for electrostatic discharge energy carried by at least the initiator assembly.

2. The method of claim 1, wherein the first material includes an electrically isolative material and the second material includes an electrically conductive material having a surface resistivity between $10^3$ and $10^9$ ohms.

3. The method of claim 1, wherein the outer body includes a conductive outer body adapted to facilitate a connection to electrical ground.

4. The method of claim 1, wherein injecting a second material different from the first material with a second shot of the two shot molding process into the mold to form an electrostatic discharge dissipater integrally molded to the initiator canister and the outer body includes encapsulating a portion of the initiator canister with the second material proximate the open end.

5. The method of claim 4, further comprising forming the electrostatic discharge dissipater to extend radially outward from the initiator canister directly to the outer body, the electrostatic discharge dissipater being integrally molded to the initiator canister, the insulative structural member and the outer body.

6. An initiator assembly comprising:
   an outer body having a first end, an opposite second end, and forming an internal passage between the first and second ends;
   an initiator canister joined to the outer body at the first end, the initiator canister defining a charge chamber for receiving a reactive charge and including a pair of electrically conductive pins extending therefrom;
   an insulative material molded within the internal passage to form an insulative structural member joining the initiator canister and pins to the outer body, the insulative structural member insulating the initiator canister from direct electrical contact with the outer body; and
   an electrostatic discharge dissipater formed from an electrically conductive material and molded to at least the outer body proximate the second end, the electrostatic discharge dissipater forming at least a portion of a pocket proximate the second end of the outer body that is adapted to receive a connector, the electrostatic discharge dissipater electrically connecting the pins to the outer body to provide a controlled dissipation path for electrostatic discharge energy carried by at least the initiator assembly.

7. The initiator assembly of claim 6, wherein the electrostatic discharge dissipater is integrally molded to the outer body and a portion of the insulative structural member to form the pocket that is adapted to receive the electrical connector.

8. The initiator assembly of claim 6, wherein the electrostatic discharge dissipater is adapted to provide a direct grounding connection between the connector and the outer body when the connector is coupled to the pocket.

9. The initiator assembly of claim 6, wherein the initiator assembly is configured to provide a three-way electrical connection in the pocket via the pins and the electrostatic discharge dissipater, a first two connections of the three-way electrical connection provided via the pins and a third connection of the three-way electrical connection being a grounding connection provided by an inner surface of the electrostatic discharge dissipater that is adapted to contact a conductive area of an interface portion of the connector.

10. The initiator assembly of claim 6, wherein the electrically conductive material includes a surface resistivity of between $10^3$ and $10^9$ ohms.

11. The initiator assembly of claim 6, wherein the outer body includes an electrically conductive outer body.

12. The initiator assembly of claim 6, wherein the initiator assembly is formed using a two shot injection molding process with the insulative structural member being formed from the insulative material injected in a first shot of the molding process and the electrostatic discharge dissipater being formed from the electrically conductive material in a second shot of the two shot injection molding process, the insulative structural member and the electrostatic discharge dissipater being integrally molded to the outer body and to each other.

13. An initiator assembly comprising:
   an electrical connector having an interface portion;
   a conductive outer body having a first end, an opposite second end, and forming an internal passage between the first and second ends;
   an initiator canister joined to the outer body at the first end, the initiator canister defining a charge chamber for receiving a reactive charge and including a pair of electrically conductive pins extending therefrom;
   an insulative material molded within the internal passage to form an insulative structural member joining the initiator canister and pins to the outer body, the insulative structural member insulating at least the initiator canister from direct electrical contact with the outer body;
   an electrostatic discharge dissipater formed from an electrically conductive material and molded to at least the outer body proximate the second end, the electrostatic discharge dissipater forming at least a portion of a pocket proximate the second end of the outer body configured to receive the interface portion of the connector, the electrostatic discharge dissipater electrically connecting the pins to the outer body to provide a controlled dissipation path for electrostatic discharge energy carried by the initiator assembly, and the electrostatic discharge dissipater providing a grounding connection between the interface portion of the connector and the outer body.

14. The initiator assembly of claim 13, wherein the electrostatic discharge dissipater is configured to provide a direct grounding connection between the connector and the conductive outer body.

15. The initiator assembly of claim 13, wherein the electrostatic discharge dissipater is configured to provide a direct dissipative path from at least one of the pins to the conductive outer body.

* * * * *